(12) United States Patent
Marvin et al.

(10) Patent No.: US 8,038,518 B2
(45) Date of Patent: Oct. 18, 2011

(54) FLUID COOLER LOCATED IN AN AIR STREAM OF A WORK ASSEMBLY OF AN AGRICULTURAL COMBINE

(75) Inventors: Paul D. Marvin, Dewitt, IA (US); Jeffrey A. Turigliatti, Geneseo, IL (US); James K. Adamson, Colona, IL (US); Todd E. Van Hal, Eldridge, IA (US); Johann H. Pierce, Dewitt, IA (US); Peter E. Kenyon, Davenport, IA (US)

(73) Assignee: Deere & Company, Moline, IL (US)

( * ) Notice: Subject to any disclaimer, the term of this patent is extended or adjusted under 35 U.S.C. 154(b) by 355 days.

(21) Appl. No.: 12/108,576

(22) Filed: Apr. 24, 2008

(65) Prior Publication Data
US 2009/0270148 A1    Oct. 29, 2009

(51) Int. Cl.
*A01F 12/60* (2006.01)
(52) U.S. Cl. ............... 460/119; 56/12.8; 460/100
(58) Field of Classification Search ............ 460/90, 460/100, 79–81, 119; 56/12.8, 14.6, 16.5, 56/DIG. 11; 165/168, 170, 916; 180/68.4, 180/68.8
See application file for complete search history.

(56) References Cited

U.S. PATENT DOCUMENTS

| 3,384,232 A * | 5/1968 | Turnbull et al. ........... 209/11 |
| 3,630,003 A * | 12/1971 | Ashton et al. ............ 56/14.7 |
| 3,727,712 A | 4/1973 | Colloton |
| 3,808,780 A * | 5/1974 | Wood ..................... 56/14.6 |
| 3,837,149 A * | 9/1974 | West et al. ................ 55/282.5 |
| 4,489,734 A | 12/1984 | Van Overschelde |
| 4,542,785 A * | 9/1985 | Bagnall et al. ........... 165/95 |
| 4,932,195 A * | 6/1990 | Compton ................ 56/340.1 |
| 5,595,537 A * | 1/1997 | Jungemann et al. ...... 460/100 |
| 6,386,306 B2 * | 5/2002 | Contoli et al. ........... 180/68.4 |
| 6,500,064 B1 | 12/2002 | Schrattenecker |
| 6,817,404 B2 * | 11/2004 | Frana-Guthrie et al. ..... 165/43 |
| 6,880,656 B2 * | 4/2005 | Pfusterschmid et al. ... 180/68.4 |
| 7,354,341 B1 | 4/2008 | Smith et al. |
| 2001/0015296 A1 * | 8/2001 | Sewell ................... 180/68.4 |
| 2007/0039302 A1 * | 2/2007 | Velke et al. ............. 56/11.9 |
| 2008/0000208 A1 * | 1/2008 | Edwards .................. 56/7 |

OTHER PUBLICATIONS

European Search Report dated Jul. 15. 2009, (6 pages).

* cited by examiner

*Primary Examiner* — Thomas Will
*Assistant Examiner* — Mai Nguyen
(74) *Attorney, Agent, or Firm* — Taylor IP, P.C.

(57) ABSTRACT

An agricultural combine includes a supporting structure. A work assembly is coupled to the supporting structure. The work assembly has a plurality of components to assist in the performing of crop processing operations. The work assembly is configured to define an air stream path. The work assembly has at least one rotary component that generates an air stream that flows through the air stream path to aid in crop processing in the work assembly. A fluid system is configured to circulate a fluid. The fluid system includes a fluid cooler that is positioned at a location in the air stream path to provide cooling of the fluid.

21 Claims, 8 Drawing Sheets

FLUID COOLER LOCATED IN AN AIR STREAM OF A WORK ASSEMBLY OF AN AGRICULTURAL COMBINE

FIELD OF THE INVENTION

The present invention is directed to an agricultural combine, and, more particularly, to a fluid cooler located in an air stream of a work assembly of an agricultural combine.

BACKGROUND OF THE INVENTION

Agricultural combines are engine powered machines that harvest, thresh, separate and clean an agricultural crop. The resulting clean grain is stored in a grain tank located on the combine. The clean grain can then be transported from the grain tank to a truck, grain cart or other receiving bin by an unloading auger.

Agricultural combines have several hydraulic components, such as drive motors, cylinders and other actuators, to perform work functions. While performing these work functions, heat is being generated and retained by the hydraulic oil. Currently, the hydraulic oil is conveyed back to an oil cooler located on the engine deck, such as near the engine radiator, for cooling of the hydraulic oil.

SUMMARY OF THE INVENTION

The invention, in one form thereof is directed to an agricultural combine. The agricultural combine includes a supporting structure. A work assembly is coupled to the supporting structure. The work assembly has a plurality of components to assist in the performing of crop processing operations. The work assembly is configured to define an air stream path. The work assembly has at least one rotary component that generates an air stream that flows through the air stream path to aid in crop processing in the work assembly. A fluid system is configured to circulate a fluid. The fluid system includes a fluid cooler that is positioned at a location in the air stream path to provide cooling of the fluid.

The invention, in another form thereof, is directed to an assembly for an agricultural combine. The assembly includes a housing structure having a structural surface defining a portion of an air stream path. A rotary component is mounted in the housing structure for generating an air stream. A fluid cooler having at least one cooling surface is located to be subjected to the air stream in the portion of the air stream path.

The invention, in another form thereof, is directed to a method for cooling fluid in an agricultural combine having a work assembly. The method includes generating an air stream used to aid in crop processing in the work assembly; and subjecting a cooling surface of a fluid cooler to the air stream for cooling the fluid.

DETAILED DESCRIPTION OF THE INVENTION

Figure 1:
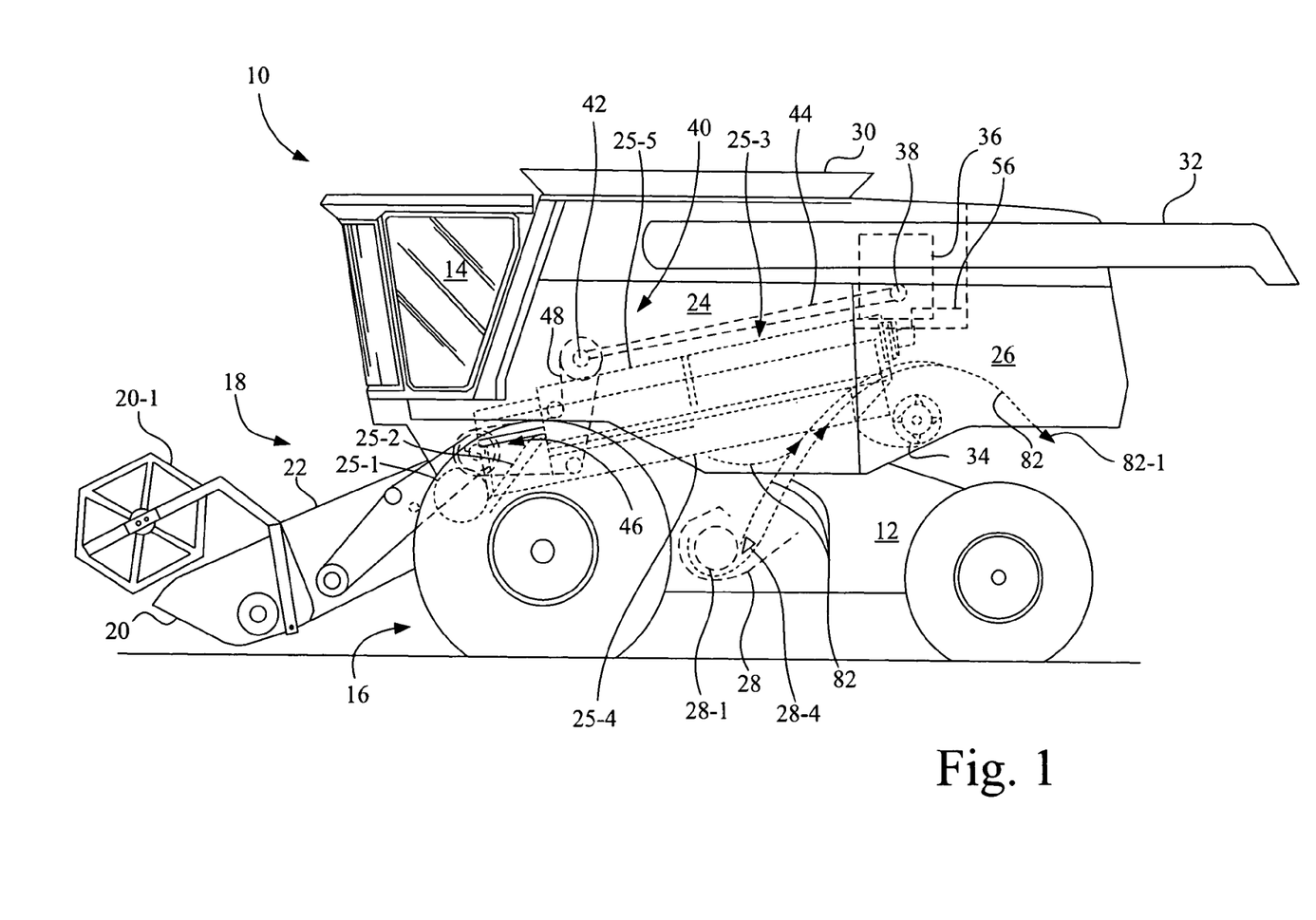
FIG. 1 is a diagrammatic side view of an agricultural combine in accordance with an embodiment of the present invention.

Referring now to the drawings, and more particularly to FIG. 1, there is shown a self-propelled agricultural combine 10. Agricultural combine 10 includes a supporting structure 12. An elevated operator station 14 is mounted at the front of agricultural combine 10. A propulsion unit 16, which may include a transmission unit, tires and/or tracks that engage the ground and a steering unit, is coupled to supporting structure 12, and performs propulsion and/or steering functions.

A work assembly 18 is coupled to supporting structure 12, and is configured to perform crop processing operations, such as for example, a harvesting operation, a threshing operation, a separating operation, a cleaning operation, and a crop residue processing operation. Work assembly 18 includes one or more rotary components, e.g., rotor, fan, drum, etc., some of which are described herein, that generate an air stream that aids in crop processing, e.g., moving crop material (i.e., crop residue and grain) in work assembly 18 and/or in separating grain from crop residue. Work assembly 18 may include, for example, a harvesting platform 20, a feederhouse 22, a main separator unit 24, and a crop residue processing unit 26.

Harvesting platform 20 may be, for example, a bean/small grain head having a reel 20-1, a corn head, etc. Harvesting platform 20 is used for harvesting a crop and directing the crop to feederhouse 22. The harvested crop is directed by feederhouse 22 to main separator unit 24, which performs threshing, separating and cleaning operations. Included in main separator unit 24 is a separator fan assembly 28 that has a separator fan 28-1. The clean grain is directed to a grain tank, or grain compartment, 30. The grain is removed from the grain tank 30 by an unloading auger 32. Crop residue is directed from main separator unit 24 to crop residue processing unit 26 that includes a trash beater 34, and may further include a straw chopper (not shown), which in turn may further shred and spread the crop residue over the field.

A transversely oriented internal combustion engine 36, diagrammatically illustrated by a rectangular box, provides the mechanical power needed to perform the propulsion, harvesting, threshing, separating, cleaning, and crop residue processing operations. Engine 36 includes a crankshaft 38 coupled to a belt-type drive system 40. Belt-type drive system 40 includes a primary countershaft 42 connected to crankshaft 38 of engine 36 by a shaft and gearbox configuration 44, which is schematically illustrated. A variable speed assembly 46 is connected to the primary countershaft 42 by a drive belt 48, which in turn is coupled to various rotatable shafts in one or more of harvesting platform 20, feederhouse 22, main separator unit 24, and crop residue processing unit 26.

Harvesting platform 20 facilitates harvesting a crop and directing the crop material to feederhouse 22. The harvested crop is directed by feederhouse 22 to main separator unit 24. Main separator unit 24 includes a feed accelerator 25-1, e.g., a rotary drum, which directs the harvested crop upwardly through an inlet transition section 25-2 to an axial crop processing unit 25-3.

Axial crop processing unit 25-3 is located between, and may be supported by the side sheets of work assembly 18 and supporting structure 12. Axial crop processing unit 25-3 includes an axial rotor housing 25-4 and an axial rotor 25-5 located in axial rotor housing 25-4. The harvested crop enters axial rotor housing 25-4 through inlet transition section 25-2. Axial rotor 25-5 is provided with an in-feed portion, a threshing portion and a separating portion. Axial rotor housing 25-4 has a corresponding in-feed section, a threshing section and a separating section.

Both crop processing portions, the threshing portion and the separating portion, are provided with crop engaging assemblies. The threshing section of the axial rotor housing 25-4 is provided with a concave and the separating section is provided with a grate. Grain and chaff released from the crop mat falls through the concave and the grate for further cleaning and processing.

Figure 2:
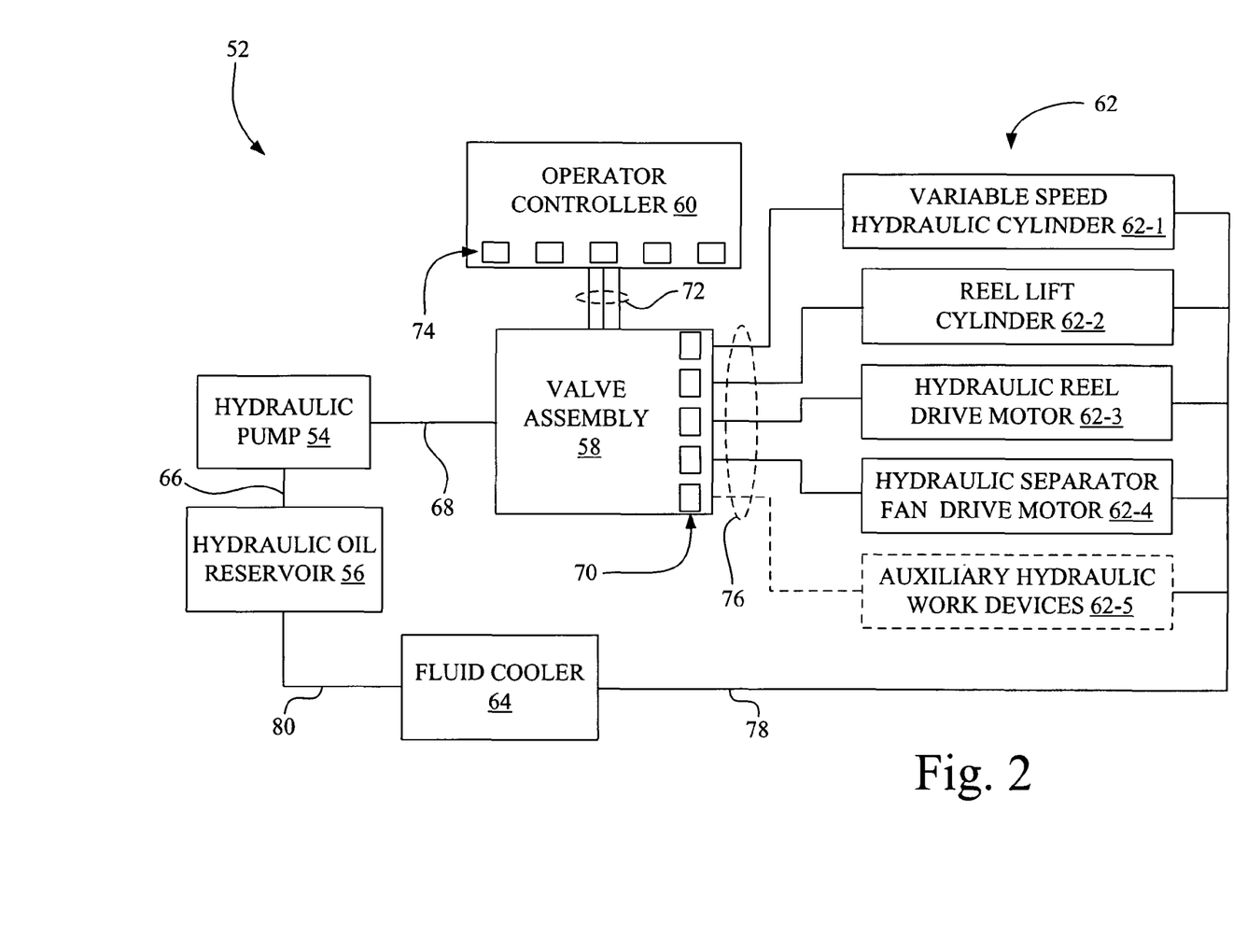
FIG. 2 is a diagrammatic illustration of an exemplary fluid system for use in the agricultural combine of FIG. 1.

Referring to FIG. 2, there is shown a diagrammatic illustration of a fluid system 52, which in the present example is in the form of a hydraulic system. While the exemplary embodiments of the invention that follow below are described using fluid system 52 configured as a hydraulic system as an example, those skilled in the art will recognize that the principles of the present invention may be applied for use with other fluid systems, such as for example, an engine oil cooling and filtering system associated with engine 36, an engine coolant system associated with engine 36, etc.

In the present example, fluid system 52 includes at least one pump, e.g., a hydraulic pump 54, for circulating a fluid, e.g., hydraulic oil; a hydraulic oil reservoir 56; a valve assembly 58; an operator controller 60; a plurality of hydraulic work devices 62; and a fluid cooler 64. Fluid system 52 is configured to selectively supply hydraulic oil under pressure to the plurality of hydraulic work devices 62 of work assembly 18 to assist in the performing of crop processing operations.

Hydraulic pump 54 is driven, directly or indirectly, off of crankshaft 38 of engine 36. Hydraulic pump 54 is connected in fluid communication with hydraulic oil reservoir 56 via a fluid path 66, which may be by direct connection to hydraulic oil reservoir 56 or an indirect connection via a fluid conduit. Valve assembly 58 may be connected in fluid communication with hydraulic pump 54 via a fluid conduit 68. Valve assembly 58 includes multiple control valves 70. It is to be understood that some of the control valves 70 of valve assembly 58 may be remotely located from other of control valves 70 of valve assembly 58.

Operator controller 60 is communicatively coupled by communications links 72 to valve assembly 58. Communications links 72 may be, for example, electrical connections and/or mechanical linkages, or a combination thereof. Operator controller 60 may include, for example, a plurality of valve controllers 74, e.g. electrical and/or mechanical valve controllers, respectively communicatively coupled by communications links 72 to the control valves 70 of valve assembly 58. Operator controller 60 may reside, for example, in operator station 14.

The plurality of hydraulic work devices 62 are respectively connected in fluid communication with control valves 70 of valve assembly 58 via a respective plurality of fluid conduits 76. Valve assembly 58 in turn selectively operates the plurality of hydraulic work devices 62 at the direction of operator controller 60. The plurality of hydraulic work devices 62 may include, for example, a variable speed hydraulic cylinder 62-1 associated with variable speed assembly 46, reel lift cylinder(s) 62-2 for adjusting the elevation of reel 20-1, a hydraulic reel drive motor 62-3 for rotatably driving reel 20-1, and a hydraulic separator fan drive motor 62-4 for rotatably driving separator fan 28-1. It is contemplated that the plurality of hydraulic work devices 62 may be expanded to include other auxiliary hydraulic work devices 62-5.

In the present exemplary embodiment, fluid cooler 64 is coupled in fluid communication with the plurality of hydraulic work devices 62 via a fluid conduit 78, and fluid cooler 64 is coupled in fluid communication with hydraulic oil reservoir 56 via a fluid conduit 80. Thus, in the present embodiment, fluid cooler 64 is interposed between, and connected in fluid communication with, hydraulic oil reservoir 56 and the plurality of hydraulic work devices 62 to provide cooling of the hydraulic oil before being returned to hydraulic oil reservoir 56.

Figure 3:
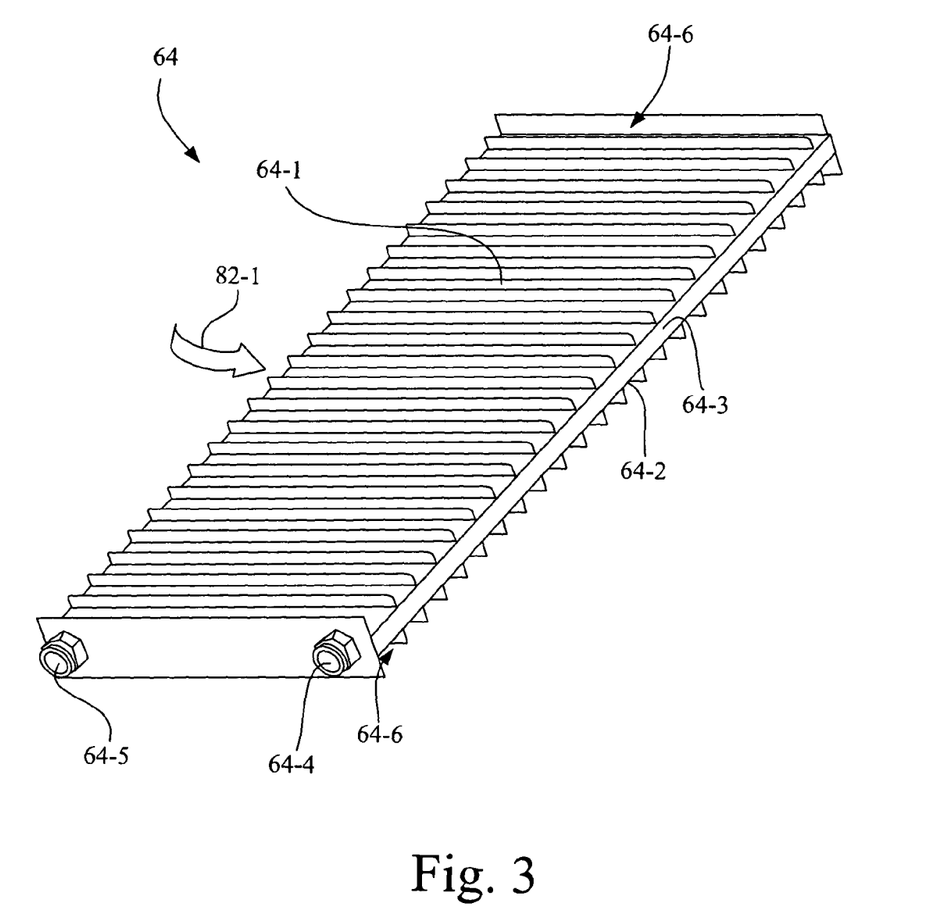
FIG. 3 is a perspective view of a fluid cooler configured in accordance with an embodiment of the present invention for use in the fluid system of FIG. 2.

FIG. 3 shows an embodiment of fluid cooler 64 having a first cooling surface 64-1, a second cooling surface 64-2, and a fluid circulation chamber 64-3 positioned between the first cooling surface 64-1 and the second cooling surface 64-2. Fluid circulation chamber 64-3 includes a fluid inlet 64-4 and a fluid outlet 64-5. Each of the first cooling surface 64-1 and the second cooling surface 64-2 includes a plurality of cooling fins 64-6 that extend outwardly from fluid circulation chamber 64-3, thereby increasing the cooling surface area of cooling surfaces 64-1, 64-2 of fluid cooler 64. The plurality of cooling fins 64-6 are arranged to direct a flow of the cooling air stream, e.g., air stream 82-1, in a predefined pattern.

In the embodiment shown in FIG. 3, the plurality of cooling fins 64-6 are arranged to be parallel, and the contour of the first cooling surface 64-1 and the second cooling surface 64-2 in the direction of flow (as indicated by the arrowhead) of air stream 82-1 is flat. However, alternative configurations are contemplated.

Figure 4:
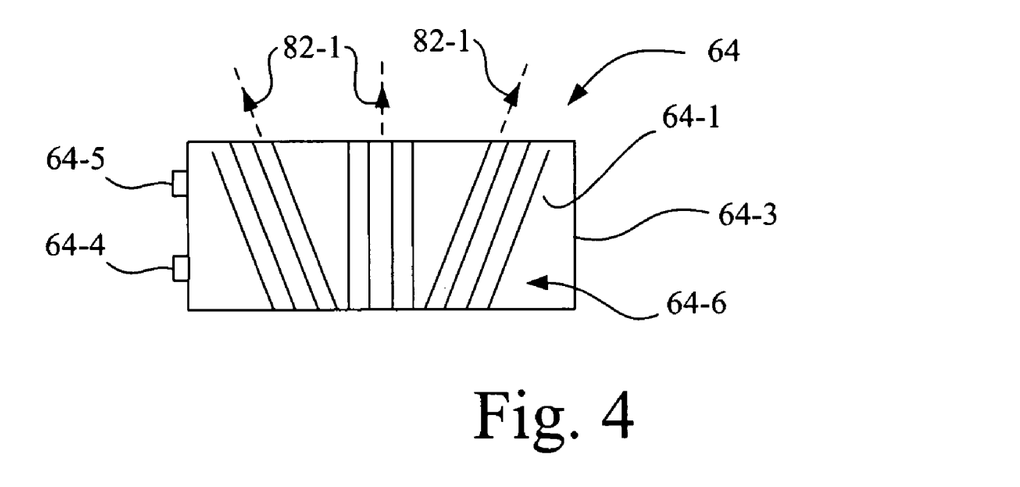
FIG. 4 is a top view of the fluid cooler configured in accordance with another embodiment for use in the fluid system of FIG. 2.
Figure 5:
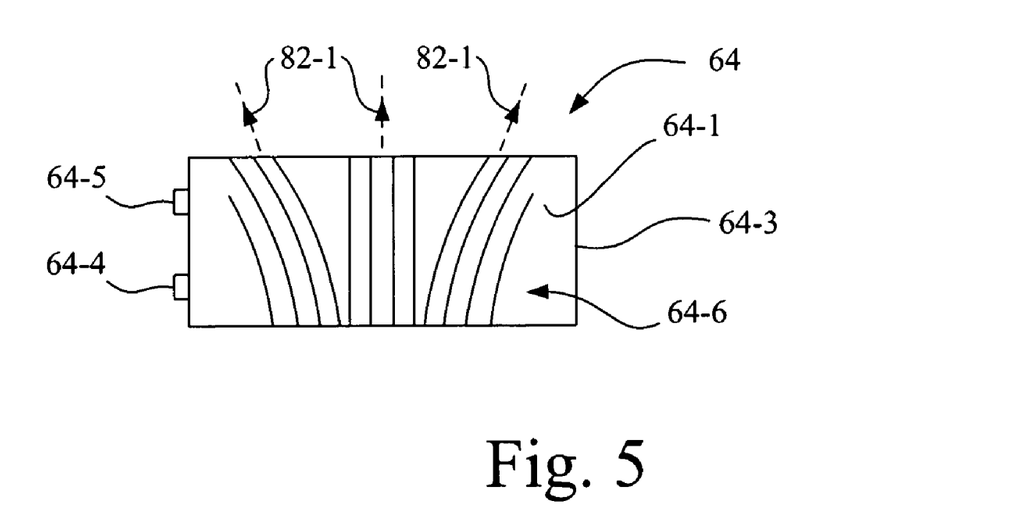
FIG. 5 is a top view of the fluid cooler configured in accordance with still another embodiment for use in the fluid system of FIG. 2.
Figure 7:
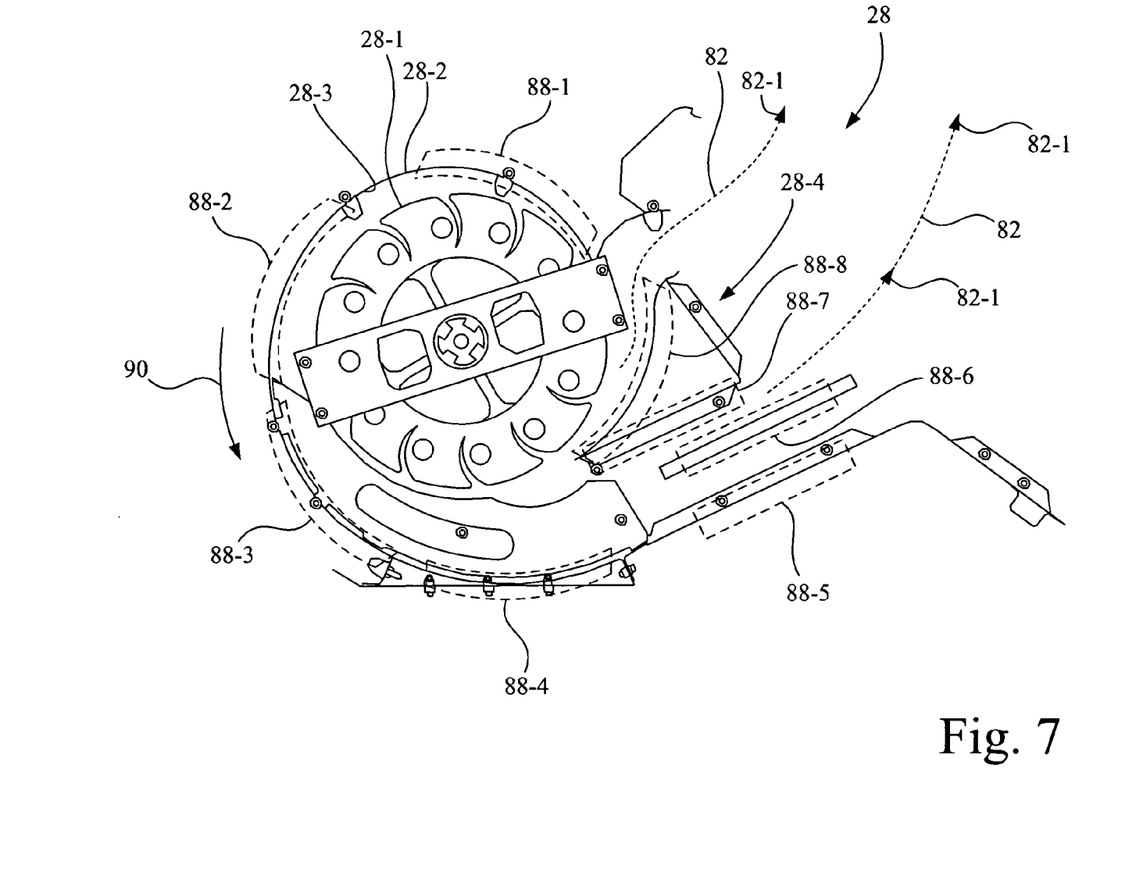
FIGS. 7-9 illustrate various exemplary locations in the separator fan assembly of the agricultural combine of FIG. 1 where one or more of the fluid coolers of FIGS. 3-5 may be mounted and/or integrated.
Figure 8:
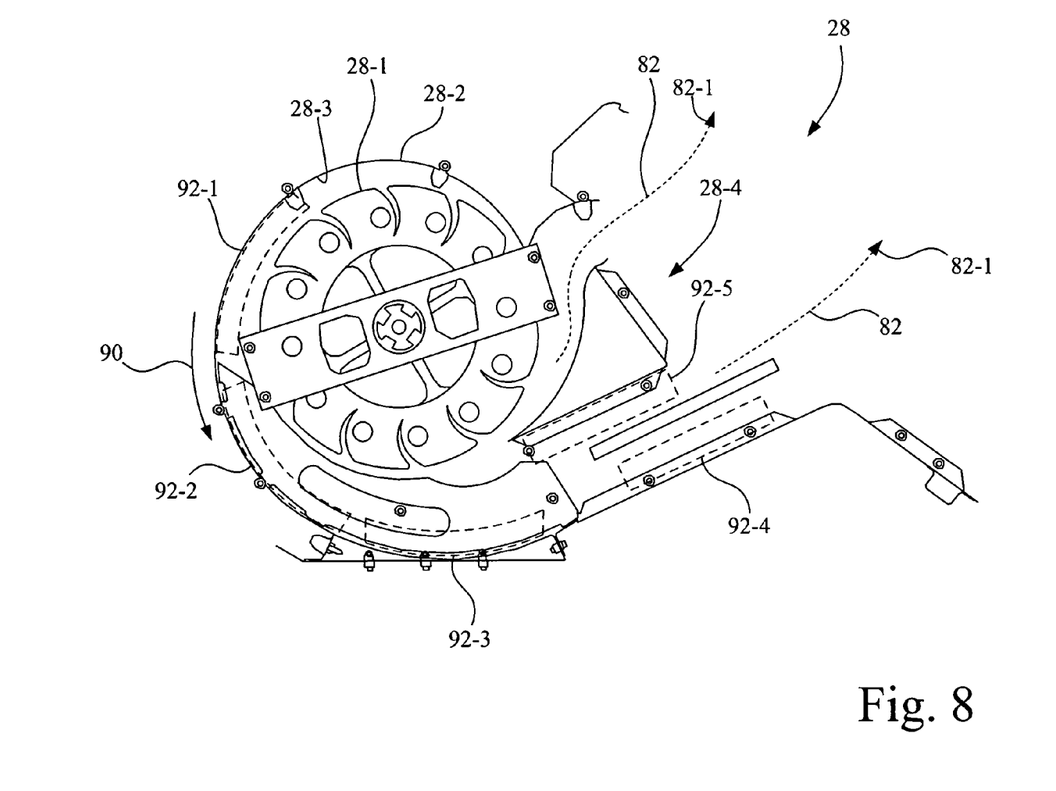
Figure 9:
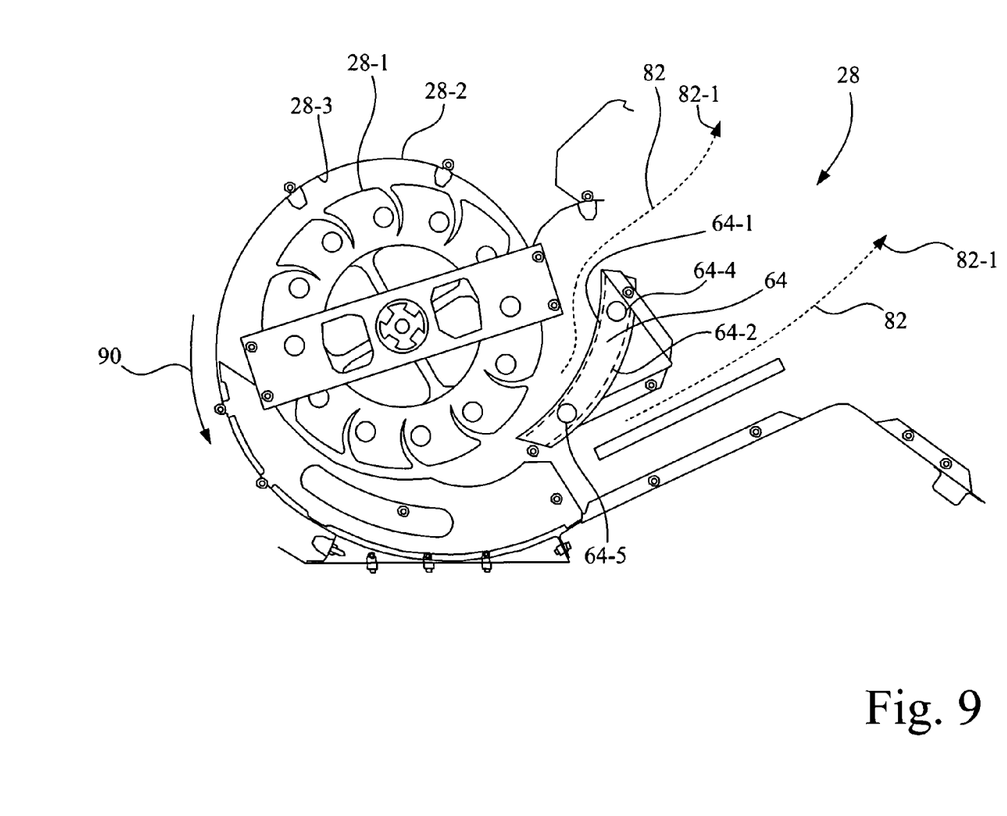

For example, as shown in FIG. 4, some or all of the plurality of cooling fins 64-6 may be arranged to be non-parallel, or as shown in FIG. 5, some or all of the plurality of cooling fins 64-6 may be curved, so as to diverge in a direction of flow of air stream 82-1 to provide additional directionality control of air stream 82-1. Also, as illustrated in FIGS. 7-9, in some embodiments the surface contour of the first cooling surface 64-1 and the second cooling surface 64-2, as well as the associated cooling fins 64-6, in the direction of flow of air stream 82-1 may be curved.

Figure 6:
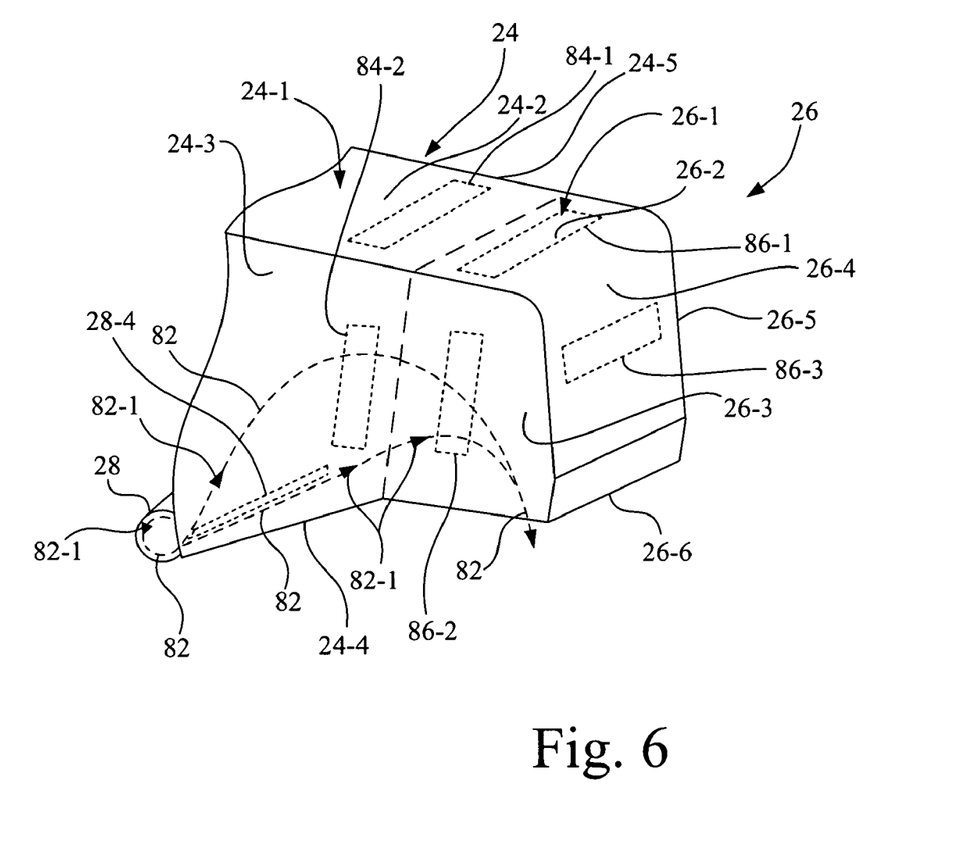
FIG. 6 is a perspective view of a portion of a work assembly of the agricultural combine of FIG. 1, which illustrates various exemplary locations where one or more of the fluid coolers of FIGS. 3-5 may be mounted and/or integrated.

As illustrated in FIGS. 1 and 6, work assembly 18 is configured with structure to define an air stream path, such as air stream path 82 shown by dashed lines, for directing an associated air stream 82-1, shown as arrowheads on the dashed lines of air stream path 82. For example, air stream path 82 may be located, at least in part, in main separator unit 24 and crop residue processing unit 26, and may be defined, for example, by the sheet metal housing 24-1 of main separator unit 24, separator fan assembly 28, and the sheet metal housing 26-1 of crop residue processing unit 26. The sheet metal housing 24-1 of main separator unit 24 includes a plurality of side walls, 24-2, 24-3, 24-4, 24-5, and the sheet metal housing 26-1 of crop residue processing unit 26 includes a plurality of side walls, 26-2, 26-3, 26-4, 26-5.

During operation, for example, separator fan 28-1 of separator fan assembly 28 is rotated to generate air stream 82-1 that flows along air stream path 82, i.e., is directed into main separator unit 24 to aid in moving crop material in work assembly 18, and more particularly, to aid in separating the grain from the crop residue. Air stream 82-1 exhausts along with crop residue through an exit 26-6 of crop residue processing unit 26 at the back of agricultural combine 10.

In accordance with an embodiment of the present invention, the cooling of fluid, e.g., hydraulic oil, engine oil, engine coolant, etc., in agricultural combine 10 is accomplished by generating an air stream, such as air stream 82-1, used to aid in crop processing, e.g., moving crop material, in work assembly 18; and subjecting a cooling surface (e.g., 64-1 and/or 64-2) of fluid cooler 64 to the air stream for cooling of the fluid.

Thus, fluid cooler 64 is positioned in work assembly 18 of agricultural combine 10 at a location in an air stream path, such as air stream path 82, e.g., in feederhouse 22, main separator unit 24, or crop residue processing unit 26, to provide cooling of fluid circulating in fluid cooler 64 by virtue of exposure of fluid cooler 64 to an air stream, such as for example air stream 82-1 flowing in main separator unit 24 and crop residue processing unit 26.

By way of example, without limitation, as illustrated in FIG. 6 possible locations for placement of fluid cooler 64 include locations for fluid cooler 64 that facilitate mounting to or being integrated with a side wall surface of sheet metal housing 24-1 of main separator unit 24 at side wall surface locations identified as 84-1, 84-2, etc., and mounting to or being integrated with a side wall surface of sheet metal housing 26-1 of crop residue processing unit 26 at side wall surface locations identified as 86-1, 86-2, 86-3, etc. Other possible locations for placement of fluid cooler 64 include, for example, locations for fluid cooler 64 that facilitate mounting to or being integrated with separator fan assembly 28, as more fully described below with reference to FIG. 7. In addition, fluid cooler may be mounted to or integrated with other component parts in work assembly 18, such as for example, axial rotor housing 25-4. In the context above, the term "integrated with" means that at least one of cooling surfaces 64-1, 64-2 of fluid cooler 64 forms a portion, e.g., a continuation, of a side wall surface, other interior surface, or component part of work assembly 18.

It is to be understood that the specific locations identified herein for positioning fluid cooler 64 on work assembly 18 are exemplary locations, and those skilled in the art armed with knowledge obtained from this disclosure will recognize that other locations on work assembly 18 may be identified as being a suitable location for fluid cooler 64.

As an added benefit of positioning fluid cooler 64 in air stream 82-1, for example, fluid cooler 64 heats air stream 82-1, thereby aiding in moisture removal in main separator unit 24 and/or crop residue processing unit 26 of work assembly 18.

FIG. 7 shows a diagrammatic side view representation of separator fan assembly 28 with possible locations 88-1, 88-2, 88-3, 88-4, 88-5, 88-6, 88-7, 88-8 for fluid cooler 64 (shown as a side view) represented by dashed blocks. Separator fan assembly 28 includes a housing structure 28-2 to which separator fan 28-1 is rotatably mounted, e.g., by bearings, for rotation in the direction of rotation indicated by arrow 90. Housing structure 28-2 has a structural surface 28-3 that defines a portion of an air stream path 82. Also shown is a wind board 28-4 located downstream of separator fan 28-1 that serves as a baffle to split air stream 82-1. As shown in FIG. 7 with respect to the various possible locations 88-1, 88-2, 88-3, 88-4, 88-5, 88-6, 88-7, 88-8 for fluid cooler 64, fluid cooler 64 may have a contour, e.g., first cooling surface 64-1, that matches the contour of structural surface 28-3 of housing structure 28-2 or wind board 28-4 with which fluid cooler 64 may be integrated. In other words, referring also to FIG. 3, in the present example cooling surface 64-1 of fluid cooler 64 may form a portion of structural surface 28-3, and the contour in the direction of air stream 82-1 may be curved or flat, depending on the contour of the respective portion of structural surface 28-3 of housing structure 28-2 or wind board 28-4 of separator fan assembly 28.

FIG. 8 shows a diagrammatic side view representation of separator fan assembly 28 in another embodiment with possible locations 92-1, 92-2, 92-3, 92-4, 92-5 for fluid cooler 64 (shown as a side view) represented by dashed blocks. In this embodiment, fluid cooler 64 may have a contour matching that of structural surface 28-3 of housing structure 28-2 to which the fluid cooler 64 may be mounted. In the present embodiment, referring also to FIG. 3, both cooling surfaces 64-1 and 64-2 may be exposed to air stream 82-1.

FIG. 9 shows a diagrammatic side view representation of separator fan assembly 28 in another embodiment, wherein fluid cooler 64 is configured with a curved profile to replace, or be mounted to, wind board 28-4 shown in FIG. 6 and serve the baffle function of wind board 28-4.

For ease of discussion, the embodiments above have been described with respect to a single fluid cooler, i.e., fluid cooler 64. However, those skilled in the art will recognize that two or more fluid coolers 64 may be incorporated into agricultural combine 10, in accordance with the principles of the present invention.

Having described the preferred embodiment, it will become apparent that various modifications can be made without departing from the scope of the invention as defined in the accompanying claims.

The invention claimed is:

1. An agricultural combine, comprising:
 a supporting structure;
 a work assembly coupled to said supporting structure, said work assembly having a plurality of components to assist in the performing of crop processing operations, said work assembly being configured to define an air stream path, said work assembly having at least one rotary component that generates an air stream that flows through said air stream path in said work assembly, said air stream moving crop material in said work assembly; and
 a fluid system configured to circulate a fluid, said fluid system including a fluid cooler that is positioned at a location in said air stream path to provide cooling of said fluid, said location being downstream in said air stream path from where said air stream begins moving the crop material in said work assembly, said air stream moving the crop material past said fluid cooler in said air stream path.

2. The agricultural combine of claim 1, wherein said work assembly includes a main separator unit and a crop residue processing unit, said air stream path being located at least in part in said main separator unit and said crop residue processing unit, said fluid cooler being located in one of said main separator unit and said crop residue processing unit.

3. The agricultural combine of claim 1, wherein said air stream path is defined in part by a surface, and said fluid cooler has a cooling surface that forms a portion of said surface.

4. The agricultural combine of claim 1, wherein said air stream path is defined in part by a surface, and said fluid cooler is mounted to said surface.

5. The agricultural combine of claim 1, wherein said main separator unit includes a separator fan assembly, said separator fan assembly including a separator fan for generating said air stream and a housing structure for housing said separator fan, said housing structure having a structural surface defining a portion of said air stream path, and wherein said fluid cooler has at least one cooling surface that is located to be subjected to said air stream in said portion of said air stream path of said separator fan assembly.

6. The agricultural combine of claim 5, wherein said fluid cooler has a first cooling surface that forms a portion of said structural surface of said housing structure.

7. The agricultural combine of claim 5, wherein said fluid cooler is mounted to said structural surface of said housing structure.

8. The agricultural combine of claim 5, wherein said fluid cooler is located downstream of said separator fan along said portion of said air stream path to serve as a wind board to split and direct said air stream.

9. The agricultural combine of claim 1, wherein said fluid cooler includes a plurality of cooling fins, wherein said cooling fins are arranged to direct a flow of said air stream in a predefined pattern.

10. The agricultural combine of claim 1, wherein said fluid system is a hydraulic system and said plurality of components is a plurality of hydraulic components, said hydraulic system being configured to selectively supply hydraulic oil under pressure to said plurality of hydraulic components of said work assembly, said hydraulic system including said fluid cooler that is positioned at said location in said air stream path to provide cooling of said hydraulic oil.

11. An agricultural combine, comprising:
a supporting structure;
a work assembly coupled to said supporting structure, said work assembly having a plurality of components to assist in the performing of crop processing operations, said work assembly being configured to define an air stream path, said work assembly having at least one rotary component that generates an air stream that flows through said air stream path to aid in crop processing in said work assembly; and
a fluid system configured to circulate a fluid, said fluid system including a fluid cooler that is positioned at a location in said air stream path to provide cooling of said fluid, said location being downstream from where said air stream begins moving the crop material, a main separator unit includes a separator fan assembly, said separator fan assembly including a separator fan for generating said air stream and a housing structure for housing said separator fan, said housing structure having a structural surface defining a portion of said air stream path, and wherein said fluid cooler has at least one cooling surface that is located to be subjected to said air stream in said portion of said air stream path of said separator fan assembly, wherein said separator fan assembly includes a wind board located downstream of said separator fan along said portion of said air stream path, said wind board being located to split and direct said air stream, said fluid cooler being mounted to said wind board.

12. An assembly for an agricultural combine, comprising:
a housing structure having a structural surface defining a portion of an air stream path;
a work assembly located downstream in said air stream path, said work assembly having a plurality of components to assist in the performing of crop processing operations;
a rotary component mounted in said housing structure for generating an air stream to move crop material in said work assembly along said air stream path; and
a fluid cooler having at least one cooling surface located to be subjected to said air stream in said portion of said air stream path, said fluid cooler being downstream from where said air stream is used to move the crop material in said work assembly, said air stream moving at least some of the crop material past said fluid cooler in said air stream path.

13. The assembly of claim 12, wherein said fluid cooler has a cooling surface that forms a portion of said structural surface of said housing structure.

14. The assembly of claim 12, wherein said fluid cooler is mounted to said structural surface of said housing structure.

15. The assembly of claim 12, wherein said at least one cooling surface of said fluid cooler includes a plurality of cooling fins, wherein said cooling fins are arranged to direct a flow of said air stream in a predefined pattern.

16. The assembly of claim 15, wherein said plurality of cooling fins are arranged to be parallel.

17. The assembly of claim 15, wherein said plurality of cooling fins are arranged to diverge in a direction of flow of said air stream.

18. A method for cooling fluid in an agricultural combine having a work assembly, comprising:
generating an air stream used to move crop material in said work assembly; and
subjecting a cooling surface of a fluid cooler to said air stream for cooling said fluid, said fluid cooler being downstream from where said air stream is used to move the crop material in said work assembly, the crop material being moved in said air stream passing by said cooling surface.

19. The method of claim 18, wherein the act of subjecting includes positioning said fluid cooler in said work assembly of said agricultural combine.

20. The method of claim 18, wherein said work assembly includes a main separator unit and crop residue processing unit, and wherein said fluid cooler is positioned in one of said main separator unit and crop residue processing unit.

21. The method of claim 18, wherein said cooling of said fluid heats said air stream to aid in moisture removal in said work assembly.

* * * * *